Figure 1:
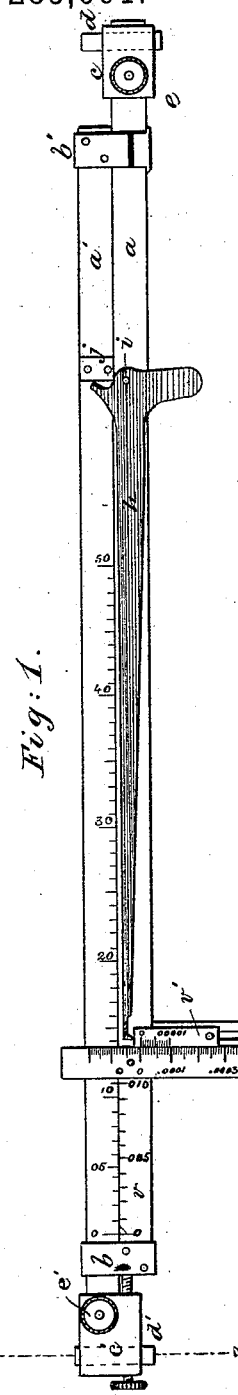

(No Model.) 3 Sheets—Sheet 1.

W. H. PAINE.
GAGE FOR ELONGATION AND COMPRESSION OF MATERIALS UNDER STRAIN.

No. 285,661. Patented Sept. 25, 1883.

Witnesses:
H. H. Young
S. M. Hopkins

Inventor:
Wm H. Paine
By Knight Bros
Attorneys

N. PETERS, Photo-Lithographer, Washington, D. C.

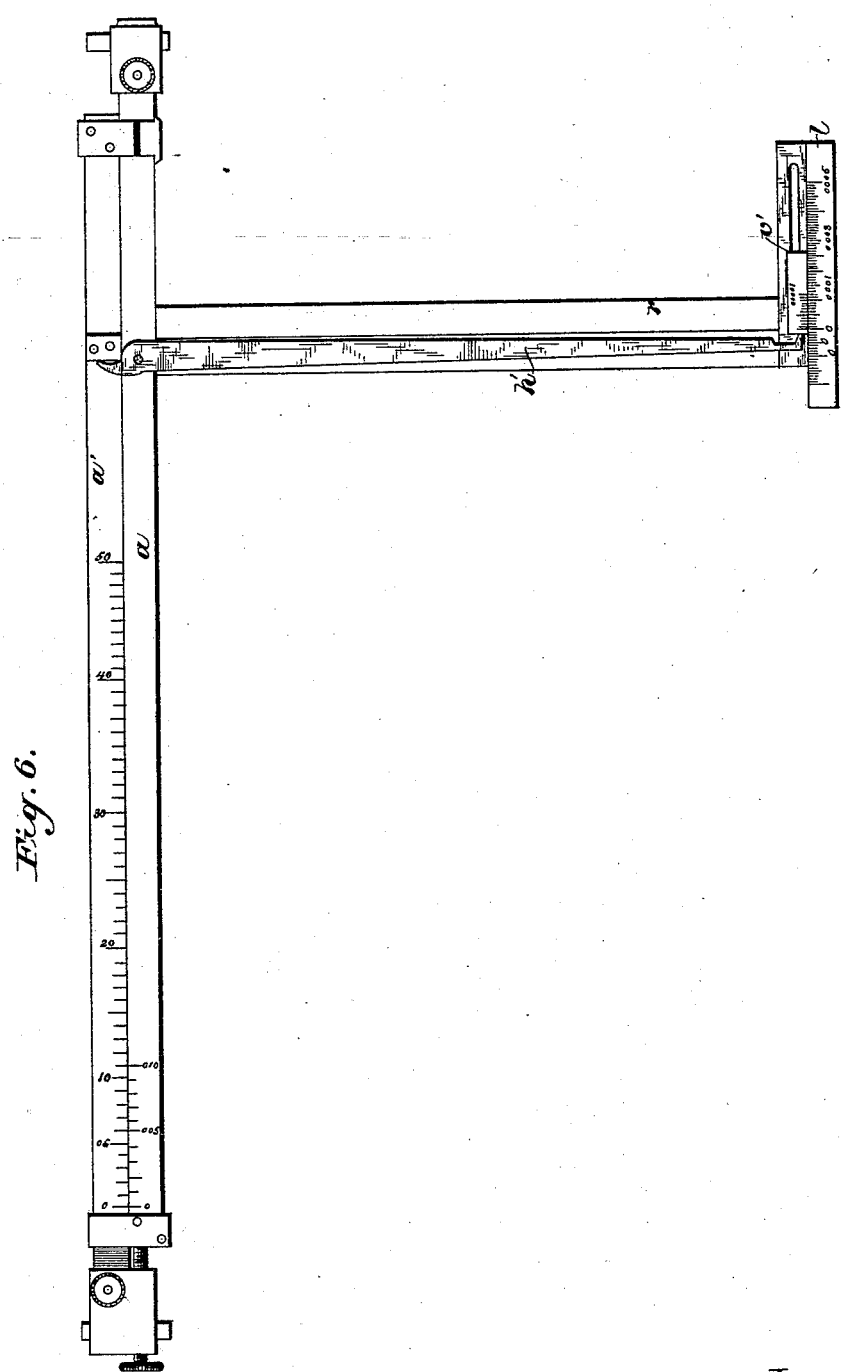

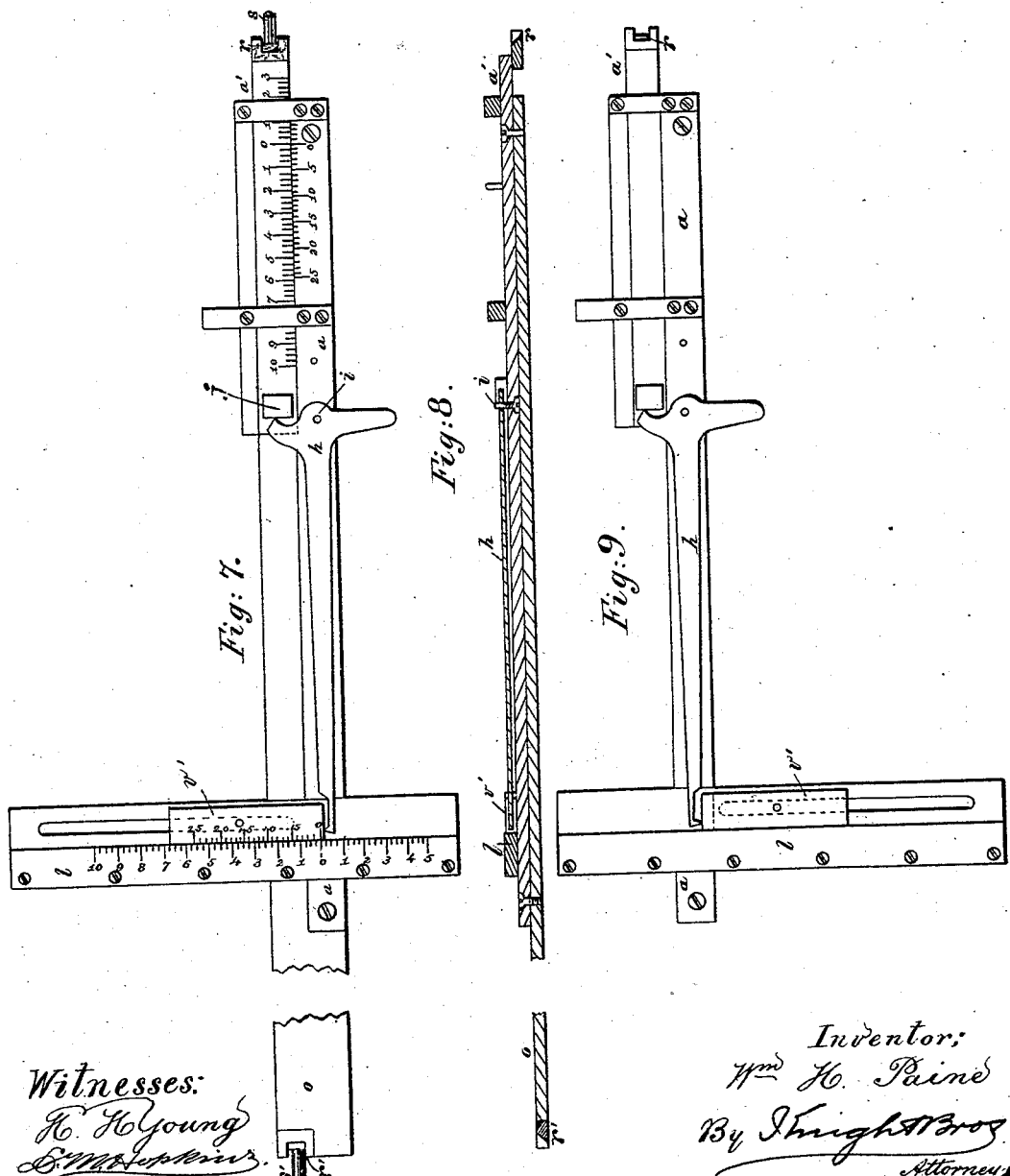

UNITED STATES PATENT OFFICE.

WILLIAM H. PAINE, OF BROOKLYN, NEW YORK.

GAGE FOR ELONGATION AND COMPRESSION OF MATERIALS UNDER STRAIN.

SPECIFICATION forming part of Letters Patent No. 285,661, dated September 25, 1883.

Application filed March 26, 1883. (No model.)

*To all whom it may concern:*

Be it known that I, WILLIAM H. PAINE, of Brooklyn, in the county of Kings and State of New York, have invented a new and useful Apparatus for Gaging the Elongation or Compression of Materials or Members of Structures under Strain, of which the following is a specification.

My apparatus in its simplest form consists of a pair of bars, each provided with means for clamping it to a piece to be tested, the points of attachment being at a determined distance asunder, said bars being provided with guides, each for the other, to permit them to slide relatively. One of the bars is graduated with a scale and the other with a vernier-scale, to be read in connection therewith. For more accurate readings a lever having a short and a long arm is fulcrumed on one of the bars, and bears by a point or knife-edge on its shorter arm against a straight surface on the other bar, perpendicular to the line of movement, while the longer arm of said lever acts on a vernier-slide guided in a line of motion tangential to the movement of said longer arm. The attachment to the piece or specimen to be gaged is effected by spring-clamps, which are superior to screws, in that they follow any contraction or expansion in thickness of the piece or specimen which may result from its elongation or compression, or from changes in temperature. Transverse knife-edges are provided to give the sliding bars the necessary hold against longitudinal movement. For gaging pieces exceeding the length of the simple apparatus, a clamp is provided for the attachment of an additional bar of any requisite length, to the end of which one of the knife-edges and a corresponding spring-clamp must be applied.

My apparatus may be adapted and arranged to indicate automatically the elongation or compression of materials or members of structures under strain, or so as to be set by hand to indicate such changes.

Figure 2:
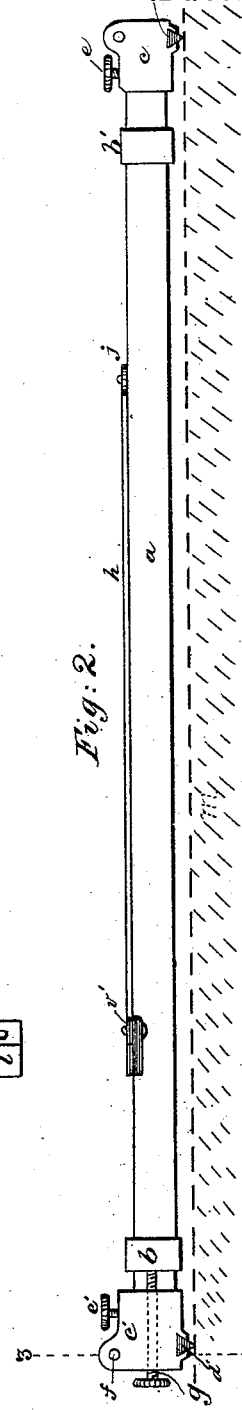
Figure 4:
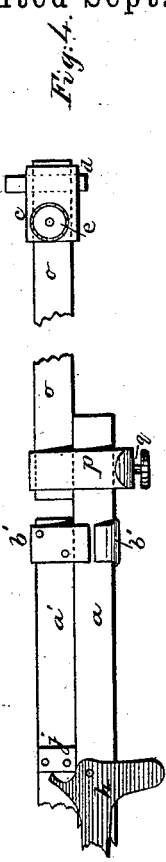
Figure 3:
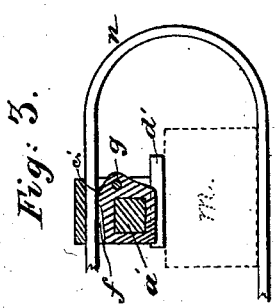

In the accompanying drawings, Figure 1 is a plan of the apparatus as used for the automatic indication of changes in length of a piece or specimen. Fig. 2 is a side view of the same.
Fig. 3 is a section on the line 3 3, Figs. 1 and 2. Fig. 4 is a plan, and Fig. 5 a side view, of the device in the form shown in Figs. 1 and 2, with the addition of an extension-bar and clamp therefor, to increase the length of the apparatus to any desirable extent. Fig. 6 is a plan of an apparatus constructed with a straight instead of an L-shaped lever. Fig. 7 is a plan of an apparatus embodying the invention, designed and adapted for occasional application by hand to members of bridges or other structures to indicate changes in the length or form thereof, as hereinafter described. Fig. 8 is a longitudinal section of the same on the line 8, Fig. 7. Fig. 9 is a plan of a modification.

The gage consists of two graduated parallel bars, $a$ $a'$, so arranged and connected as to slide longitudinally in relation to each other, one end of each bar having a guide, $b$ or $b'$, secured to it for the other bar to move in. The opposite ends of the bars are provided with attachment-plates $c$ $c'$, secured adjustably to the respective bars by milled-headed screws $e$ $e'$. Each attachment-plate carries a knife-edge, $d$ $d'$, for making contacts with the specimen or piece, $m$, to be gaged, and an aperture, $f$, for receiving the end of a spring, $n$, which holds the gage securely against longitudinal movement on the piece or specimen, pressing the knife-edges firmly against the specimen or piece subjected to stress.

In addition to a vernier, $v$, and scale graduated on the face of the sliding bars, for the purpose of more minutely and accurately indicating changes in length, there is provided a lever, $h$, with a short and a long arm. In the form of the instrument illustrated in Figs. 1 to 5, inclusive, I have shown a lever of bell-crank or L shape—that is to say, with arms at right angles to each other. This lever is fulcrumed on a pivot, $i$, on the face of the sliding bar $a$, with the short arm extending over to and having a knife-edge coming in contact with a shoulder, $j$, raised upon the face of the other slide, $a'$. The long arm of the lever has a similar knife-edge, which comes in contact with and moves a vernier, $v'$, on the edge of a graduated scale, $l$, in such manner that when the knife-edge of the short arm is brought in contact with the shoulder $j$ in the varying positions of the slides the vernier $v'$ in contact with the knife-edge of the long arm will indicate the position and movement of the sliding bars relatively to each other, the movement being thus multiplied by the number of times that the long arm exceeds the length of the short arm.

It is evident that as the movement of the one bar parallel to the other is tangential to the curve described by the short arm of the lever, the movement of the index or vernier on the scale tangential to the long arm will be in the exact proportion to the movements of the former that the length of the short arm bears to the length of the long arm.

In practice I arrange that when some desired unit of measure is represented by the distance between the two points of contact of the gage with the piece under measurement, the vernier on the face of the sliding bars, and also that moved by the long lever-arm, shall stand at zero. I also arrange that the changes of length shall be represented upon both scales and verniers in decimals of the unit of measure.

Figure 5:
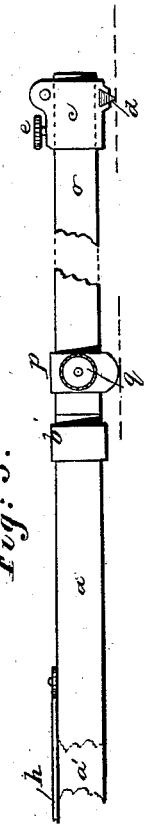

In Figs. 4 and 5, $o$ represents an extension-bar secured to the bar $a$ by a clamping-sleeve, $p$, and screw $q$. The contact-block $c$, carrying the knife-edge $d$, is fastened by its clamp-screw $e$ to the extension-bar $o$ at any point in the length of the latter so as to bring it to the required distance from the knife-edge $d'$ at the other end.

Instead of the bell-crank or L-shaped lever already described, a straight lever, $h'$, may be used, as illustrated in Fig. 6. In this case the fixed scale $l$, in which the vernier-slide $v'$ is guided, is mounted on an arm $r$, fixed at right angles to the bar $a$, so that the movement of the vernier-slide will be tangential to the sweep of the lever, as before.

In the form of the apparatus shown in Figs. 7 and 8 the position of the lever $h$ is reversed, so that the bearing-shoulder $j$ will rest against the heel of the lever by the contraction instead of by the extension of the sliding bars. The relations of the vernier-slide $v'$ and the longer arm of the lever being the same as in the other illustration, it will be apparent that the movement of the lever $h$ by hand in the operation of the apparatus, which movement is limited by the contact of the heel of the lever $h$ with the shoulder $j$, will also act upon the vernier-slide $v'$, and the latter will indicate accurately the extent of this movement. In this form of the apparatus the sliding bar $a'$ is provided at its extremity with a knife-edged thrust-plate, $r$, adapted to engage with a suitable stud or bearing, $s$, on the bridge member or other structure or piece to be gaged, while to the opposite end of the bar $a$ is connected, adjustably or otherwise, an extension-bar, $o$, having at its extremity a similar knife-edged plate, $r'$, to engage with a corresponding stud or abutment, $s'$, at the required distance from the stud or bearing $s$.

One mode of using this apparatus by hand is as follows: Supposing it be desired to determine the extension of a member of a bridge or other structure during a given period of use or under a given load, the apparatus is first applied to the bearings $s\ s'$ and the distance between them carefully noted upon the scales. When the load is applied, or when the bridge or other structure has been for a time under a strain, the apparatus is again applied, with the knife-edged thrust-plate $r$ against the stud or bearing $s$, and the bar $a'$ is slid endwise to bring the knife-edged thrust-plate $r'$ to a firm bearing against the abutment $s'$. The lever $h$ is then moved so as to bring its heel firmly against the bearing-surface $j$, the vernier $v'$ being carried forward by the contact of the longer arm of the lever. The amount of extension will then be accurately gaged by the position of the verniers $v\ v'$ in comparison with their former position.

In practice the measuring-bar $o'$ for each particular bridge will be made of the same material as the member it is employed to gage, painted the same color, and filed away, so that the gage and the member to be gaged may in all respects be exposed to the same conditions and effects of atmosphere, temperature, &c. In this manner structures may be subjected to repeated tests and the results accurately recorded from time to time.

It will be apparent that an apparatus with the lever in the position shown in Fig. 9, and with the vernier $v'$ in the reverse position, as shown in Fig. 9, will be adapted for gaging the effect of compression on a structure, piece, or specimen, the construction of such piece or specimen in this case imparting a positive movement to the vernier-slide $v'$. The instrument, when at zero, should give the desired unit of measurement—one foot or one meter, for example.

The apparatus constitutes a simple portable instrument adapted for use in any place where it may be required. It is applicable to gaging the elongation or contraction of specimens under strains of tension or compression in a testing-machine, or to structures in use—as, for example, tension-bars of bridges; or it may, when desirable, be applied to thrust or compression members of bridges, edifices, or other structures.

Having thus described my invention, the following is what I claim as new therein and desire to secure by Letters Patent:

1. An apparatus for gaging the elongation or compression of materials or members of structures under strain, consisting of parallel bars guided so as to slide relatively to each other, and provided with spring-clamps for fixing them at determined points to the piece to be gaged or tested.

2. An apparatus for gaging the elongation or compression of materials or structures under strain, consisting of parallel bars adapted to be clamped, respectively, at determined distances asunder, to the piece to be gaged or tested, and a lever fulcrumed on one of the parallel bars, and resting by its shorter arm against a bearing on the other, and a gaging-slide controlled in its movement by contact with the longer arm of the lever, substantially as and for the purposes set forth.

3. In an apparatus for gaging the elongation or compression of materials or members of structures under strain, the combination of a pair of sliding bars, means for attaching said bars at determined points to the piece to be gaged or tested, a lever fulcrumed on one of the bars and resting against a straight bearing on the other bar, perpendicular to their line of movement, and a vernier-slide moved by the longer arm of the lever and guided in a line tangential to the sweep of said longer arm, substantially as explained.

4. The combination of the parallel sliding bars $a\ a'$, the lever $h$, and the vernier-slide $v'$, moved by direct contact of the lever $h$ without intervening attachment.

5. The combination, with the bar $a$, of a lever, $h$, fulcrumed thereon, and bearing at its respective ends on straight surfaces on the slides $a'$ and $v'$, substantially as and for the purposes explained.

WILLIAM H. PAINE.

Witnesses:
GEO. W. MCNULTY,
A. L. CURTIS.